Jan. 30, 1934.  A. E. READ  1,944,904
SQUEEZING APPARATUS
Filed Oct. 2, 1931  3 Sheets-Sheet 1

INVENTOR.
Arthur E. Read
BY
ATTORNEY.

Jan. 30, 1934.   A. E. READ   1,944,904
SQUEEZING APPARATUS
Filed Oct. 2, 1931   3 Sheets-Sheet 2

INVENTOR.
Arthur E. Read
BY
ATTORNEY.

Jan. 30, 1934.  A. E. READ  1,944,904
SQUEEZING APPARATUS
Filed Oct. 2, 1931  3 Sheets-Sheet 3
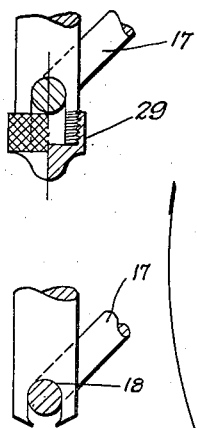
Fig. 10
Fig. 7
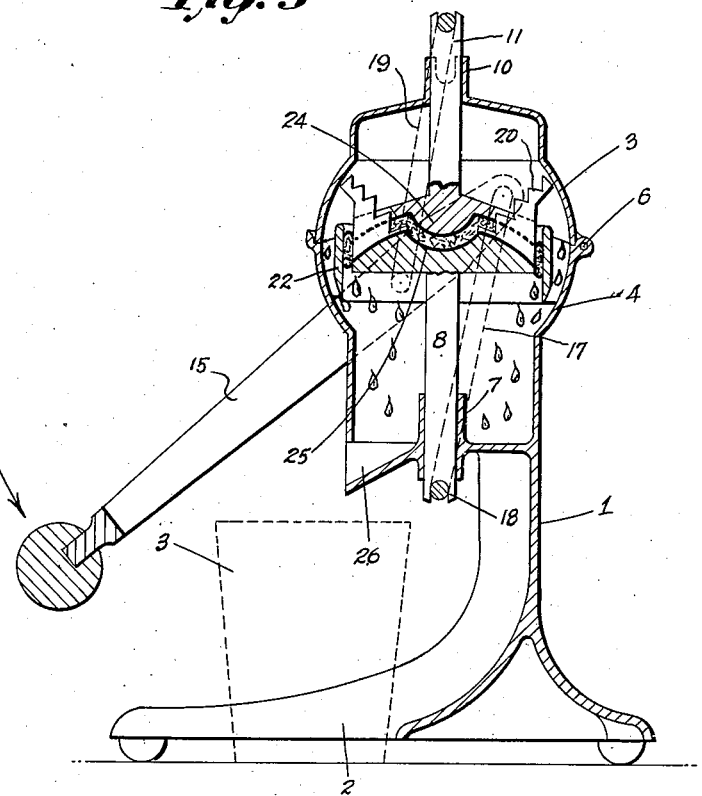
Fig. 5
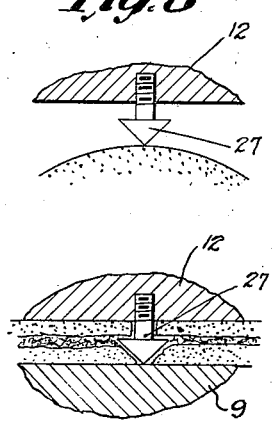
Fig. 8
Fig. 9
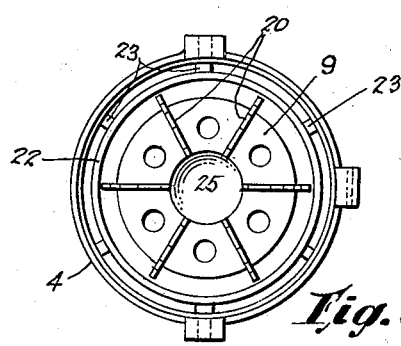
Fig. 6
INVENTOR.
Arthur E. Read
BY
Cornelius Zabriskie
ATTORNEY.

UNITED STATES PATENT OFFICE

1,944,904
SQUEEZING APPARATUS

Arthur E. Read, Bronx, N. Y., assignor of one-half to Irving J. Henry, Garden City, Long Island, N. Y.

Application October 2, 1931. Serial No. 566,531

11 Claims. (Cl. 100—45)

This invention is a squeezing apparatus particularly intended for the squeezing of oranges, although it may be made in appropriate sizes to squeeze other fruits, such as lemons, limes, etc. For the purpose of concrete description, I will hereinafter refer more particularly to the employment of the invention in connection with the squeezing of oranges.

The object of the present invention is to provide a simple and efficient machine which may be manually operated and which is capable, when easily manipulated by hand, to act upon a whole orange in one operation in order to squeeze the entire orange. In other words, it is the purpose of this invention to provide a machine adapted to receive a whole orange, and to operate upon it in such manner that through one cycle of operations, the juice of the orange is extracted.

In the preferred practical form of the invention, this result is accomplished through the employment of two plungers operating in opposite directions toward and away from one another within a suitable casing in which the orange is adapted to be received. Within this casing is formed a so-called compression zone, which, in the preferred form of the invention, is circumscribed by a retaining member in the form of a ring. An orange deposited in the casing is adapted to be acted upon by the plungers within the confines of the retaining member and one of these plungers, preferably the lower one is provided with a series of perforating and cutting knives, which, as the plungers are brought together, first operate to perforate the fruit, then cut the same, and subject the fruit to sufficient axial pressure to effectually flatten it out and exude therefrom its juice.

I have discovered in this connection that, for the best results, cutters of the type specified should be employed because the skin of an orange is tough and unyielding to a knife edge. When the knives are so shaped, as by serrating their edges that they will first perforate and then cut, a most efficient operation results and the peel is broken and partially cut before the sufficient pressure is applied to cause it to be ruptured. Consequently, a good clean cut results, and as the pressure is applied, the cut is spread sufficiently to permit the juice to be forced out without a mechanical rupture of the peel. This operation I have found highly efficient for the reason that the juice is strained through the pulp of the fruit and comes out clear. In other words, very little pulp is squeezed out and the pits or seeds are retained in the peel.

The use of a retaining member or ring as described is highly efficient for the reason that it permits juice which is exuded from the upper portion of the orange to flow over the upper edge of the ring and be immediately carried away from the pressing operation, while the juice which is exuded from the bottom of the orange is free to flow off by gravity, and is consequently immediately carried away from the pressure zone, so that when the pressure is relieved to remove the peel, it will not suck up or carry away any appreciable amount of residual juice.

The squeezing of an orange requires considerable pressure, but the present invention minimizes the actual human force required to operate the apparatus through the employment of a double toggle action, which multiplies the force to such extent that a relatively small expenditure of energy will apply more than the required pressure to the fruit.

The apparatus is simple in construction, thoroughly efficient in its operation, is not apt to become out of order and is such that persons need have no fear of injury to their hands in the operation of the machine. Furthermore, the parts are so constructed as to facilitate cleaning, so that the apparatus may be kept at all times in a clean and sanitary condition.

Features of the invention, other than those adverted to, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 5 shows a completion of the pressing operation.

Figure 6 is a plan view of the body of the casing with the cover removed.

Figure 7 is a detail section showing the manner in which one of the toggle bails may be conveniently connected to one of the plunger stems.

Figures 8 and 9 are fragmental sections showing certain impaling means which I may employ to facilitate the removal of the peel after pressing.

Figure 10 shows a modified form of detail construction.

Figures 1, 2:
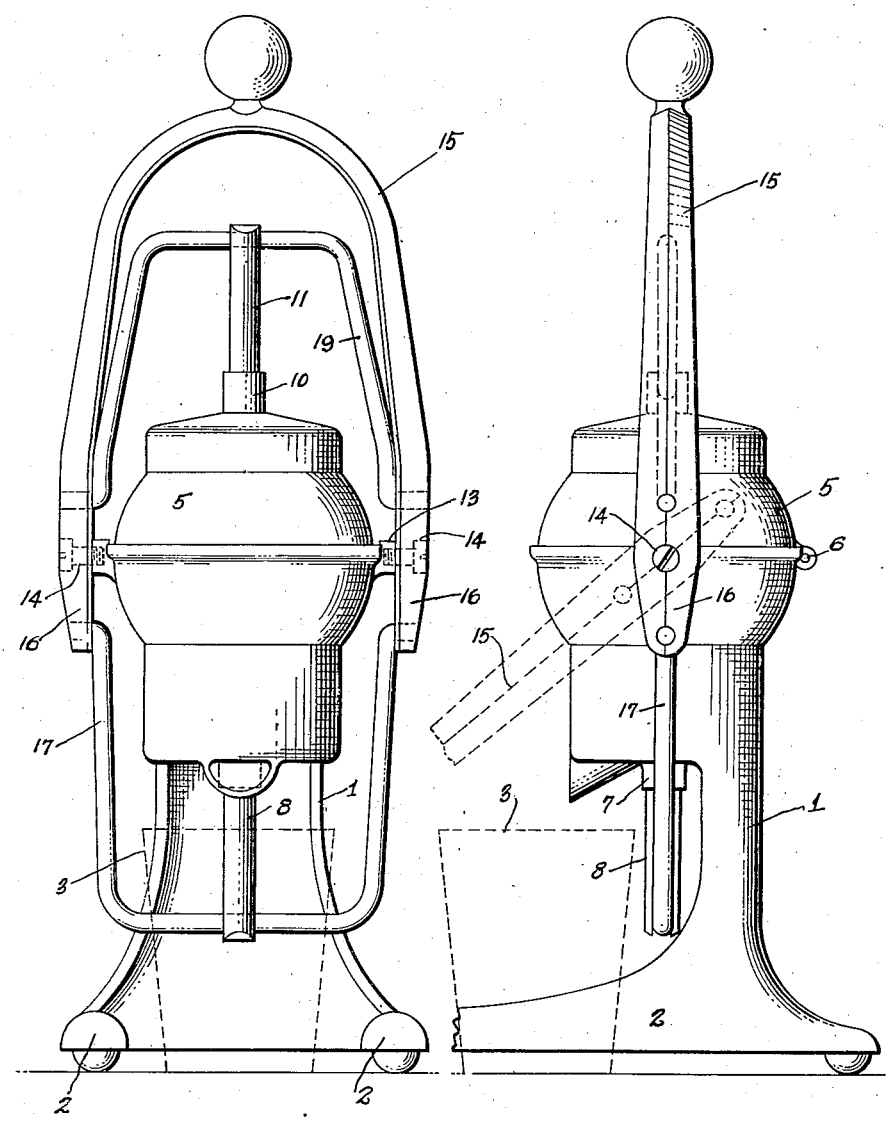
Figure 1 is a front elevation of an apparatus embodying the present invention.
Figure 2 is a side elevation of this apparatus.

Referring to the drawings, 1 indicates a suitable standard provided with an appropriate base 2 having diverging legs to permit a tumbler 3 to be placed in proper position to receive juice extracted by the machine.

The upper portion of the standard, which may be conveniently made in the form of a casting is hollowed to form the lower portion 4 of a casing. The upper portion 5 of the casing is shaped to cooperate with the portion 4 and is hinged thereto as shown at 6, so that the upper portion of the casing is movable from the position shown in Figure 3 to that of Figure 6 and vice versa.

Within the lower portion 4 of the casing is provided an axial bearing 7 and in this bearing is fitted a stem 8 of a plunger 9 which I term the lower plunger. Similarly, the upper section 5 of the casing which serves the function of a cover is provided in the center of its top with a bearing 10 in which is guided the stem 11 of an upper plunger 12.

Positioned diametrically on the opposite sides of the lower section 4 of the casing are a pair of tapped bosses 13, and these bosses are adapted to receive screws 14, which serve to support the U-shaped operating handle 15 for pivotal movement about the alined axes of these screws. It will be noted that the ends of the U-shaped operating handle extend beyond the pivots to form extensions 16 and near the end of these extensions are pivoted the opposite ends of a U-shaped bail 17, which is operatively connected to the free end of the lower plunger 8. Links or any other appropriate operative connection may be employed in lieu of this bail or of the bail to be associated with the upper plunger, as hereinafter described, but the structure shown is convenient and economical to manufacture and is thoroughly efficient in its operations. As shown the bail is received in a bifurcation 18 in the lower end of the stem 8 and the mouth of the bifurcation is thereupon peened or otherwise slightly closed, as shown in Fig. 7, so as to preclude disengagement of the bail from the bifurcation. In this way, the bail is secured to the plunger stem with the result that the plunger is reciprocated as the operating handle is pivotally moved.

In a similar manner, the plunger stem 11 of the upper plunger is secured by a bail 19 to the operating handle 15 on the opposite side of the pivots 14 with the result that both plungers are simultaneously operated by the handle member 15 in opposite directions, so as to advance toward one another or recede from one another as the case may be. It is to be noted in this connection that each bail with the corresponding cooperating portion of the handle member constitutes in effect a toggle and as a result, the two plungers are operated from the handle through a double toggle arrangement adapted to transmit great power due to the great leverage.

Supported on the upper surface of the lower plunger 9 are a series of upstanding knives 20, the upper edges of each of which are serrated or toothed while the axes of symmetry of these edges are inclined in an upward and inward direction. There are six such knives shown, although a greater or lesser number may be employed. In any event, when the parts are in the position shown in Figure 3, they form a seat for an orange 21 when the same is introduced into the casing as shown in this figure. In other words, when a whole orange is deposited in the lower section of the casing, it comes to rest on these knives.

Figure 3:
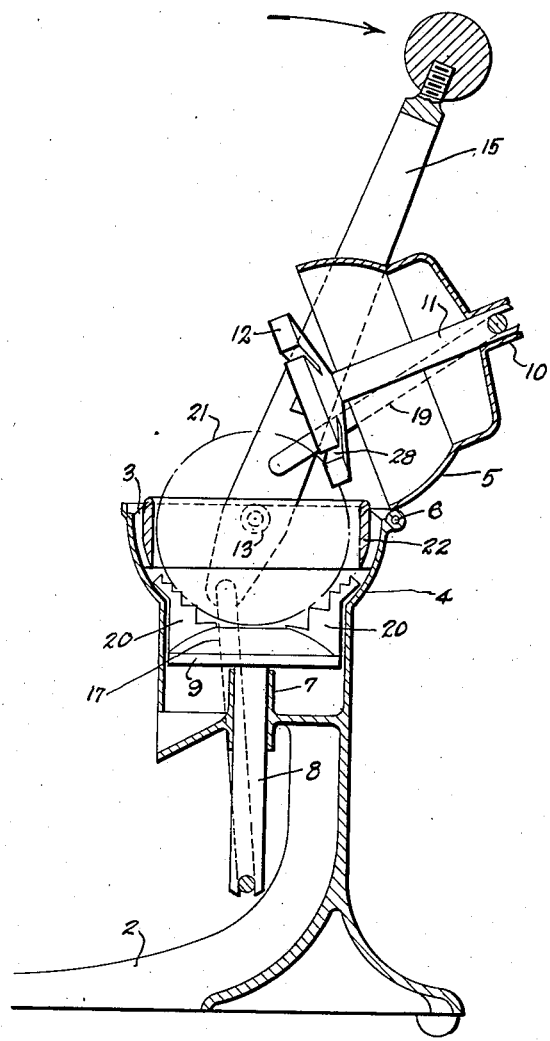
Figure 3 is a section of the apparatus in opened condition with an orange introduced therein.

By reference to Figure 3, it will be noted that when the orange is in place in the machine, it is at rest within the confines of a retaining member 22 which I have shown in the form of a ring spaced inwardly from the wall of the casing by spacers 23, so as to leave a juice passage between the ring 22 and the wall of the casing. This ring has an inner diameter somewhat larger than the largest orange, which would ordinarily be used in such machine, but somewhat smaller than the same orange would be if it were flattened out into circular form. For example, experience has shown that the average size of an orange is approximately two and one-half to two and seven-eighths inches. Few are larger than this size. If such an orange is flattened out, by pressure, it will assume a diameter in excess of four inches. In order to keep the machine within small dimensions and at the same time to permit of proper freeing of the juice, the retainer 22 is employed, and it is found to be highly important in practice to employ such a retainer or its equivalent.

If it be assumed, therefore, that the parts are in the positions shown in Figure 3 that the machine is opened and an orange is in place therein, the mode of operation in squeezing the juice from such orange will be as follows.

Figure 4:
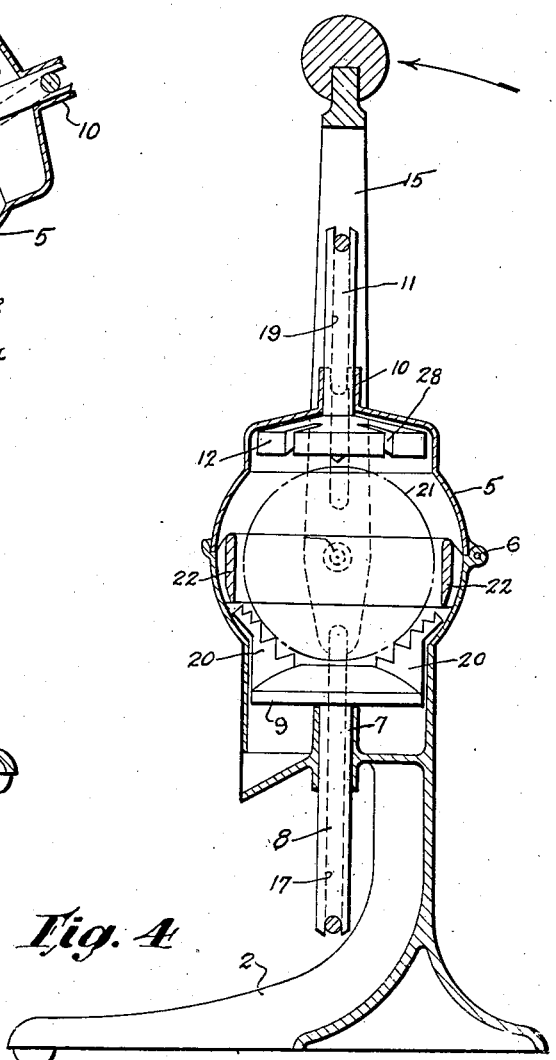
Figure 4 shows the machine closed upon the orange and in a condition wherein pressure is about to be applied thereto.

The operating handle 15 is first moved from the position of Figure 3 into the substantially vertical position of Figure 4 and during this operation the cover or upper portion 5 of the casing will be closed due to the fact that the upper bail 19 is operated by the handle upon a different center from the pivotal point of the cover 5.

When the parts are in this position, the casing will be entirely closed at the joint between the upper and lower portion of the cover, the lower plunger will be supporting the orange, while the upper plunger will be in a position directly above and about to engage with the orange. From the position of Figure 4, the operation of the handle is continued in a counter-clockwise direction and the strong toggle action to which I have referred causes the plungers to be forced toward one another. As soon as pressure is applied to the orange between the plungers, the points of the serrated edges of the knives 20 perforate the peel causing the knives to readily enter the interior of the orange and make a clean cut. As the operation proceeds, the knives enter the orange forming, in the apparatus shown, six cuts and as these cuts are formed, the orange is pressed downwardly and flattened out in a lateral direction until the orange engages the confines of the ring 22. Thereupon, further lateral expansion of the arms is precluded. The operation of the handle continues in the direction stated until it reaches the position shown in Figure 5 at which time practically all the juice which it is possible to obtain from an orange has been squeezed therefrom and different portions of the skin of the orange are in substantial contact with one another. During the squeezing operation, juice exuded from the upper portion of the orange flows over the upper end of the ring 22 and down into the base of the lower portion 4 of the casing, while the juice squeezed from the lower portion of the orange falls directly into that portion of the receptacle, so that all the juice is immediately carried away from the orange upon being squeezed therefrom.

As a result when the operations described are reversed, and pressure on the orange peel is relieved, the juice will not be soaked up again. In connection with the operation of squeezing as described, attention is directed to the shaping of the coacting faces of the plungers. The upper plunger is substantially concave, but is provided at its center with a semi-spherical projection 24. The upper surface of the lower plunger is complementarily shaped, i. e., it is convex, but is provided in its center with a concave depression 25. The purpose of the projection 24 is to insure proper cutting and perforation of the orange before actual squeezing, because the softness of the fruit permits the projection 24 to indent the top of the orange somewhat and allows the fruit to yield while it is being perforated and the cutting operation commenced. During the subsequent pressing operations, the projection 24 and cavity 25 cooperate to minimize lateral expansion of the fruit and make it possible to use a smaller ring 22 than would otherwise be feasible.

These features to which I have referred have been demonstrated practically and should be incorporated in the machine if maximum efficiency is to be obtained. I do not wish to be understood, however, as limiting to all of these features as some very satisfactory results can be obtained without utilizing all of them.

The juice which falls into the lower portion of the casing 4 is adapted to be discharged therefrom through a chute or outlet 26 into the tumbler 3 as shown in Figure 5.

An interesting feature of this invention resides in the fact that during the pressing operation, the peel is opened sufficiently by means of the cuts described to permit the juice to be exuded, but as the juice leaves the peel it is strained through the pulp of the orange, so that practically no pulp is found in the juice. Similarly, the seeds are entrapped, so that no strainer or other means for removing these undesirable constituents is necessary. The peels are removed from the machine and are not fractured or broken, but are simply opened and freed of their liquid contents.

With reference to the removal of the peel, it will be apparent from what has been said that when the handle is moved from the position of Figure 5 back to the position of Figure 3, the plungers are retracted and the casing opened. It is a peculiarity of this machine that the fruit is squeezed, so tightly within the ring 22, that when the plungers are retracted, the fruit remains in this position and can be readily lifted out by hand. It may be noted, however, in this connection that if it is desired to provide for the removal of the peel from the casing, this may be readily provided for by providing on the under surface of the upper plunger 12 one or more studs 27, as shown in Figure 8. These studs are headed, and are of a length substantially equal to twice the thickness of the peel of the fruit, so that when the orange is squeezed the peel is impaled by the studs and when the machine is opened as in Figure 3, the spent peel will adhere to the studs and can be readily removed therefrom by hand. It will of course be understood, as shown in the drawings, that the upper plunger is slotted as at 28 to allow of the passage of the knives 20, and it is through the slots thus provided that the juice is exuded from the top of the fruit. The pressure applied, however, is sufficiently great, so that at the conclusion of the pressing operation, the cuts in the fruit are opened up sufficiently to permit the knives to easily withdraw therefrom.

Another important characteristic of this invention resides in the fact that the cover is not acted upon by direct mechanical connections, other than through the operation of the upper plunger. As a result persons operating the machine need have no fear of injury to the fingers even though the hand is left in a position to be engaged by the cover when the latter closes, because if the cover engages an obstruction sufficient friction is set up between the cover and the plunger stem to jamb the machine and preclude further closing of the cover. This is a safety feature protecting an operator against possible injury although in the operation of this apparatus there need be no fear of bodily harm for the reason that the orange may be dropped into the machine and does not require to be held in any position during any operation.

It will be further noted that the machine is, aside from the operation of the handle, substantially automatic in the carrying out of its functions. The mere operation of the handle which may be readily accomplished by hand brings about first the closing of the cover and this is followed in rapid succession by perforation and cutting of the fruit with concurrent and subsequent application of pressure thereto. If studs, such as shown in Figs. 8 and 9, are used, the retrograde movement of the handle which brings about an opening of the machine also causes a removal of the fruit, so that it can be readily lifted off of the studs by hand.

Practical experience has shown that it is of utmost importance to remove the juice from the zone of compression as soon as it is exuded. The present invention provides for this for the reason that when the fruit is compressed into final condition, it caps the relatively shallow height of the ring within which is formed the compression zone. Above and below the edges of this ring, the juice is free to escape into the tumbler associated with the machine.

In the construction described, the links or bails 17 and 19 are permanently associated with the plunger stems. I have found, however, that the parts may be more readily dismantled for cleaning if a detachable connection is employed. This may be accomplished by omitting the swedging as described in connection with Figure 7 and threading the ends of the plunger stems, so that they may receive retaining caps 29 as shown in Figure 10. These caps may be screwed off when desired to permit the plungers to be removed, so that access may be had to all parts of the interior of the apparatus.

The foregoing detailed description sets forth the invention in its preferred, practical form, but for the reasons hereinbefore stated, the invention is to be understood as fully commensurate with the appended claims.

Having thus fully described the invention, what I claim as new and desire to secure by Letters Patent is:

1. In an apparatus of the character described, a pair of plungers mounted coaxially for movement toward and away from one another to squeeze fruit interposed between them, knives mounted on at least one of the plungers to cut the fruit and facilitate the flow of juice therefrom, said knives having sloping serrated edges to expedite the puncturing and subsequent cutting of the fruit, means for operating said plungers to act upon the fruit, and a retaining member positioned to embrace the fruit at substantially the mid portion thereof to limit lateral spreading of the fruit during the squeezing operation to a predetermined maximum.

2. In an apparatus of the character described, a pair of plungers mounted in axial alinement for movement toward and away from one another to squeeze fruit interposed between them, one of said plungers being provided on its operating face with radially disposed knives having sloping serrated edges and the other of said plungers being slotted to permit the entrance of the knives when the plungers are brought into proximity, means for forcing the plungers toward one another to cut and squeeze fruit between them, and means embracing the fruit to preclude its lateral expansion beyond a predetermined maximum.

3. In an apparatus of the character described, a pair of plungers mounted in axial alinement for movement toward and away from one another to squeeze fruit interposed between them, one of said plungers being provided on its operating face with radially disposed knives having sloping serrated edges and the other of said plungers being slotted to permit the entrance of the knives when the plungers are brought into proximity, means for forcing the plungers toward one another to cut and squeeze fruit between them, and a retaining ring positioned to embrace the fruit at its mid section, whereby, when the fruit is compressed between the plungers, the pressure is applied thereto within the confines of said ring, a casing surrounding the ring and fruit therein, said casing being spaced from the ring to permit the juice exuded from the fruit to flow unobstructedly away from the zone of compression.

4. In an apparatus of the character described, a casing provided in its upper portion with a chamber adapted to receive fruit to be squeezed and having in its lower portion a reservoir to receive the juice exuded from said fruit, plungers operable in alinement through the top and bottom of said casing, and movable toward and away from one another to squeeze fruit interposed between them, means for operating said plungers, and a retaining member spaced inwardly from the wall of the casing and surrounding the fruit at its mid section to limit the lateral expansion of the fruit during the pressing operation to a predetermined maximum and to permit juice exuded from the upper portion of the fruit to flow unobstructedly into the reservoir.

5. In an apparatus of the character described, a casing provided in its upper portion with a chamber adapted to receive fruit to be squeezed and having in its lower portion a reservoir to receive the juice exuded from said fruit, plunger stems operable in alinement through the top and bottom of said casing, plungers carried by said stems within the casing and movable toward and away from one another to squeeze fruit interposed between them, and means for operating said plungers.

6. In an apparatus of the character described, a standard, a casing supported thereon, said casing having a cover pivoted thereto and having a fluid outlet at its lower portion, plunger stems operable through the bottom and through the cover of said casing and guided by the casing and cover, respectively, for coaxial movement toward and away from one another, plungers carried by said stems within the casing, a U-shaped handle pivoted to the exterior of the casing, U-shaped bails secured at their bases to the respective plunger stems and having their free ends pivotally attached to the handle on opposite sides of the axis of pivotal movement of the handle, whereby movement of the handle will cause the plungers to be moved toward and away from one another.

7. In an apparatus for extracting juice from whole fruit, the combination of an upstanding casing adapted to receive whole fruit, alined plunger stems operable through the top and bottom walls of the casing, a plunger carried by each stem interiorly of said casing, cutters carried by one plunger, the other plunger having slots registering with said cutters, and means for operating said plunger stems to reciprocate the plungers toward and away from one another for the purpose of cutting and squeezing whole fruit between them.

8. In an apparatus for extracting juice from whole fruit, the combination of a casing having a cover hinged thereto, said casing being adapted to receive whole fruit, alined plunger guides in the casing and its cover, alined plunger stems extending from the exterior to the interior of the casing and guided for reciprocation in said plunger guides, a plunger carried by each stem interiorly of the casing, cutters carried by one of the plungers and the other plunger having slots registering with said cutters, and means for operating said plunger stems to reciprocate the plungers toward and away from one another to squeeze whole fruit introduced into the casing between them.

9. In an apparatus for extracting juice from whole fruit, the combination of a casing having a cover hinged thereto, said casing being adapted to receive whole fruit, alined plunger guides in the casing and its cover, alined plunger stems extending from the exterior to the interior of the casing and guided for reciprocation in said plunger guides, a plunger carried by each stem interiorly of the casing, knives carried by one of the plungers and the other plunger having slots registering with said knives, a forked shaped operating handle, the arms of which straddle the casing and are pivoted to the opposite sides thereof, a bail connecting said arms on one side of the pivots to one plunger stem and a second bail connecting said arms on the other side of the pivots to the other plunger stem, whereby pivotal movement of the handle will reciprocate said stems to move the plungers toward and away from one another to cut and squeeze whole fruit introduced into the casing between them.

10. In an apparatus for extracting juices from whole fruit, the combination of a suitable standard, a casing supported thereon and provided at its base with a plunger guide, a cover pivoted to the casing and also provided therein with a plunger guide, plunger stems mounted to reciprocate in alined relation through the plunger guides in the casing and its cover, plungers carried by the plunger stems interiorly of the casing, an operating handle pivoted to the casing, and link connections between the operating handle and the respective plunger stems, whereby the handle may be operated in one direction to close the cover and force the plungers toward one another to squeeze fruit between them, said handle being operable in the opposite direction to separate the plungers and open the cover.

11. In an apparatus for extracting juices from whole fruit, the combination of a suitable standard, a casing supported thereon and provided with an elongated plunger guide, a cover pivoted to the casing and also provided with an elongated plunger guide adapted to cooperate with a close fitting plunger stem to preclude relative pivotal movement between the plunger stem and the cover and to guide the plunger stem for reciprocation, plunger stems mounted to reciprocate in alined relation through the plunger guides in the casing and its cover, plungers carried by the plunger stems interiorly of the casing, an operating handle pivoted to the casing, and operative connections between the operating handle and the respective plunger stems, whereby the handle may be operated in one direction to close the cover and force the plungers toward one another to squeeze fruit between them, said handle being operable in the opposite direction to separate the plungers and open the cover.

ARTHUR E. READ.